United States Patent
Winston et al.

(10) Patent No.: US 12,433,878 B2
(45) Date of Patent: Oct. 7, 2025

(54) USES OF BUPIVACAINE MULTIVESICULAR LIPOSOMES AS STELLATE GANGLION BLOCK

(71) Applicant: Pacira Pharmaceuticals, Inc., San Diego, CA (US)

(72) Inventors: Roy Winston, Tampa, FL (US); Jared Ham, Severn, MD (US); Jonathan Slonin, Palm City, FL (US)

(73) Assignee: Pacira Pharmaceuticals, Inc., San Diego, CA (US)

( * ) Notice: Subject to any disclaimer, the term of this patent is extended or adjusted under 35 U.S.C. 154(b) by 0 days.

(21) Appl. No.: 18/171,831

(22) Filed: Feb. 21, 2023

(65) Prior Publication Data

US 2023/0277516 A1 Sep. 7, 2023

Related U.S. Application Data

(60) Provisional application No. 63/313,691, filed on Feb. 24, 2022.

(51) Int. Cl.
*A61K 31/445* (2006.01)
*A61K 9/00* (2006.01)
*A61P 23/02* (2006.01)

(52) U.S. Cl.
CPC .......... *A61K 31/445* (2013.01); *A61K 9/0019* (2013.01); *A61P 23/02* (2018.01)

(58) Field of Classification Search
CPC ...... A61K 31/445; A61K 9/0019; A61P 23/02
See application file for complete search history.

(56) References Cited

U.S. PATENT DOCUMENTS

| | | | |
|---|---|---|---|
| 6,045,824 A | 4/2000 | Kim et al. | |
| 11,033,495 B1 | 6/2021 | Hall et al. | |
| 2002/0039596 A1 | 4/2002 | Hartounian et al. | |
| 2024/0156799 A1 | 5/2024 | Spranger | |

FOREIGN PATENT DOCUMENTS

| WO | WO 99/013865 | 3/1999 |
|---|---|---|
| WO | WO 21/141959 | 7/2021 |

OTHER PUBLICATIONS

Tian et al., Effective Use of Percutaneous Stellate Ganglion Blockade in Patients with Electrical Storm, Circulation: Arrhythmia and Electrophysiology, 12, p. 1-9. (Year: 2019).*
Qureshi et al., Long Acting Liposomal Bupivacaine for Percutaneous Sympathetic Stellate Ganglion Blockade: a Technical Note, Journal of Vascular and Interventional Neurology, 9, p. 49-53. (Year: 2017).*
Davidson et al., High-Dose Bupivacaine Remotely Loaded into Multivesicular Liposomes Demonstrates Slow Drug Release Without Systemic Toxic Plasma Concentrations After Subcutaneous Administration in Humans, International Society of Anaesthetic Pharmacology, 110, p. 1018-1023. (Year: 2010).*
Kim et al. A Prospective, Randomized Cross-Over Trial of T2 Paravertebral Block as a Sympathetic Block in Complex Regional Pain Syndrome, Pain Physician, 22: E417-E424. (Year: 2019).*
Tighe et al. Paravertebral block (Continuing Education in Anaesthesia, Critical Care & Pain, 10:5, 133-137). (Year: 2010).*
Abrich et al., Jan. 10, 2017, Left Stellate Ganglion Block: Increasing Clinician Awareness in the Eye of the Electrical Storm, American College of Cardiology, vol. 76. Retrieved from the Internet: URL:https://www.acc.org/latest-in-cardiology/articles/2017/01/10/12/11/left-stellate-ganglion-block [retrieved on Mar. 25, 2023].
Davidson et al., 2010, High-Dose Bupivacaine Remotely Loaded into Multivesicular Liposomes Demonstrates Slow Drug Release Without Systemic Toxic Plasma Concentrations After Subcutaneous Administration in Humans, Anesthesia & Analgesia, 110(4):1018-1023.
Ferrillo, 2016, Treatment of complex regional pain syndrome with stellate ganglion local anesthetic blockade: a case report of one patient's experiences with traditional bupivacaine HCI and liposome bupivacaine, Clinical Case Reports, 4(9):861-865.
García-Morán et al., 2016, Refractory Electrical Storm: A Role for Transient Sympathetic Blockade, Rev. Esp. Cardiol., 69(1):75-85.
Hayase et al., Aug. 2013, Percutaneous stellate ganglion block suppressing VT and VF in a patient refractory to VT ablation, J. Cardiovasc Electrophysiol., 24(8): doi:10.1111/jce. 12138, 6 pp.
Kowlgi et al., 2020, Management of ventricular electrical storm: a contemporary appraisal, Europace, 22:1768-1780.
Malik et al., 2017, Emerging roles of liposomal bupivacaine in anesthesia practice, Journal of Anaesthesiology Clinical Pharmacology, 33:151-156.
Meng et al., 2017, Efficacy of Stellate Ganglion Blockade in Managing Electrical Storm: A Systematic Review, JACC Clinical Electrophysiology, 3(9):942_949.
Naseem et al., 2012, Bupivacaine Extended Release Liposome Injection Does Not Prolong QTc Interval in a Thorough QT/QTc Study in Healthy Volunteers, Journal of Clinical Pharmacology, 52:1441-1447.
Qureshi et al., 2017, Long Acting Liposomal Bupivacaine for Percutaneous Sympathetic Stellate Ganglion Blockade: A Technical Note, Journal of Vascular and Interventional Neurology, 9(5):49-53.
Tian et al., 2019, Effective Use of Percutaneous Stellate Ganglion Blockade in Patients With Electrical Storm, Circulation: Arrhythmia and Electrophysiology, 12:e007118, pp. 1-9.

(Continued)

*Primary Examiner* — Joseph K McKane
*Assistant Examiner* — Meghan C Heasley
(74) *Attorney, Agent, or Firm* — Knobbe Martens Olson & Bear, LLP

(57) ABSTRACT

Embodiments of the present disclosure relate to the use of bupivacaine multivesicular liposomes (MVLs) as stellate ganglion block (SGB) for treating or ameliorating various diseases and conditions, including but not limited to cardiac electrical storm or cardiac arrythmia/dysrhythmia following heart surgery.

18 Claims, No Drawings

(56) References Cited

OTHER PUBLICATIONS

International Search Report and Written Opinion dated Apr. 12, 2023 in International Application No. PCT/US2023/062936.
Bramlett et al., Dec. 1, 2015, Long-Term Consequences of Traumatic Brain Injury: Current Status of Potential Mechanisms of Injury and Neurological Outcomes, J. Neurotrauma, 32:183401848.
Bryant, Oct. 2019, Post-traumatic stress disorder: a state-of-the-art review of evidence and challenges, World Psychiatry 18:259-269.
Chan et al., 2010, A case of sympathetically mediated headache treated with stellate ganglion blockade, Pain Med. 11:1294-1298.
Deng et al., Apr. 6, 2023, Treatment of stellate ganglion block in diseases: Its role and application prospect, World J Clin Cases, 11(10):2160-2167.
Hutchins et al., Oct. 2018, Ultrasound-guided stellate ganglion block with liposome bupivacaine for malignant ventricular arrhythmia: a case report, Regional Anesthesia and Pain Medicine, 43(7):Supplement 1, e68.
Nampiaparampil, Aug. 13, 2008, Prevalence of chronic pain after traumatic brain injury: a systematic review, JAMA, 300(6):711-719.
Pavlovic et al., 2019, Traumatic brain injury: neuropathological, neurocognitive and neurobehavioral sequelae, Pituitary, 22:270-282.

\* cited by examiner

USES OF BUPIVACAINE MULTIVESICULAR LIPOSOMES AS STELLATE GANGLION BLOCK

INCORPORATION BY REFERENCE PRIORITY APPLICATION

The present application claims the benefit of priority to U.S. Provisional Application No. 63/313,691, filed Feb. 24, 2022, which is incorporated by reference in its entirety.

BACKGROUND

Field

The present disclosure relates to compositions of bupivacaine multivesicular liposomes (MVLs) and uses thereof as stellate ganglion block (SGB).

Description of the Related Art

Bupivacaine is a versatile drug that has been shown to be efficacious for a wide variety of indications, including: postoperative analgesia, peripheral nerve blocking, diagnostic and therapeutic procedures, and obstetrical procedures. See Obaid Malik, et al., *Emerging roles of liposomal bupivacaine in anesthesia practice,* 33 Journal of Anaesthesiology Clinical Pharmacology, 151 (2017). Bupivacaine and other anesthetics have been utilized in left cardiac sympathetic denervation procedures to suppress ventricular arrhythmias in patients who are unable to undergo surgical resection of the extrinsic sympathetic chain.

Ventricular arrhythmias (VA) are abnormal heart rhythms that occur in the lower chambers of the heart, causing the heart it to beat too fast, too slow, or irregularly. Ventricular tachycardia (VT) or ventricular fibrillation (VF) are associated with increased risk of sudden cardiac death. Electrical storm (ES) is generally defined as a state of cardiac electrical instability characterized by multiple episodes (e.g., three or more episodes) of sustained VT or VF within a 24-hour period. It has been shown that cardiac denervation increases ventricular arrhythmia threshold. For example, in instances that surgical stellate ganglion blockade was not feasible, temporary percutaneous stellate ganglion blockade has been shown to be an effective therapy for an adult patient with drug-refractory VT and VF. See Justin Hayase, et al., *Percutaneous Stellate Ganglion Block Suppressing VT and VF in a Patient Refractory to VT Ablation,* 24 J. Cardiovasc Electrophysiol (2013). Similarly, transient sympathetic blockade has been reported to be a useful technique for the control of refractory ES, in which the number of arrhythmia episodes declined during the first 24 hours after the initiation of sympathetic blockade. See Emilio García-Moran, et al., *Refractory Electrical Storm: A Role for Transient Sympathetic Blockade,* 69 Rev. Esp. Cardiol., 76 (2016).

The stellate ganglion provides sympathetic innervation to the heart. The stellate ganglion is split into the left stellate ganglion and the right stellate ganglion, each of which innervates different portions of the heart. The left stellate ganglion provides greater innervation to the ventricles in comparison to the right stellate ganglion. Blockade of the stellate ganglion (for example, the left stellate ganglion or both the left stellate ganglion and the right stellate ganglion) can reduce the amount of positive catecholamines (for example, epinephrine and norepinephrine) at the heart and increase the level of input and stimulation needed for fibrillation of the ventricles. The stellate ganglion is formed by a fusion of the C7, C8, and T1 regions (for example, the C7, C8, and T1 ganglia) of the paravertebral chain. In some individuals, the stellate ganglion can also include the C6 region (for example, the C6 ganglia) of the paravertebral chain. In some individuals, the stellate ganglion can also include the T2 region (for example, the T2 ganglia) of the paravertebral chain. In some individuals, the stellate ganglion can also include the T3 region (for example, the T3 ganglia) of the paravertebral chain. In other individuals, the T2 region and/or the T3 region are not part of the stellate ganglion. In some individuals, the T1 nerve and/or the T2 nerve can provide sympathetic stimulation to the heart at least partially through alternative pathways that bypass the stellate ganglion.

In Lingjin Meng, et al., *Efficacy of Stellate Ganglion Blockade in Managing Electrical Storm,* 3 JACC: Clinical Electrophysiology, 942 (2017), short-acting anesthetics, such as lidocaine or ropivacaine, were found to suppress ventricular arrhythmias for only for several hours. While longer-acting anesthetics such as mepivacaine or bupivacaine were found to suppress ventricular arrhythmias for up to several days, there were multiple reported side effects associated with the use of large volumes of bupivacaine. See Ying Tian, et al., *Effective Use of Percutaneous Stellate Ganglion Blockade in Patients with Electrical Storm,* 12 Circ. Arrhythm. Electrophysiol., (2019), and Victor Abrich, et al., *Left Stellate Ganglion Block: Increasing Clinician Awareness in the Eye of the Electrical Storm,* American College of Cardiology, 76 (2017).

As a result, previous attempts to suppress cardiac arrythmia such as ventricular arrhythmias had limited success and/or entailed adverse effects to the patient. Therefore, there remains a need to develop a new minimally invasive method to suppress ventricular arrhythmias while limiting the patient's abrupt exposure to large volumes of long-acting anesthetics.

SUMMARY

Some embodiments of the present disclosure relate to a method of treating a patient suffering from electrical storm, comprising: administering a composition comprising an effective amount of bupivacaine multivesicular liposomes (MVLs) to one or more nerves of stellate ganglion of the patient, or an autonomic tissue area peripheral to the stellate ganglion, or a combination thereof. In some embodiments, the method further comprises identifying or selecting a patient has suffered from or is at risk of suffering from one or more episodes of cardiac arrhythmia. In some embodiments, the method further comprises identifying or selecting a patient has suffered from or is at risk of suffering from electrical storm.

Some embodiments of the present disclosure relate to a method of treating or ameliorating a cardiopulmonary disease in a patient in need thereof, comprising: administering a composition comprising an effective amount of bupivacaine MVLs to one or more nerves of stellate ganglion of the patient, or an autonomic tissue area peripheral to the stellate ganglion, or a combination thereof. In some embodiments, the method further comprises identifying or selecting a patient has suffered from or is at risk of suffering from the cardiopulmonary disease.

Some embodiments of the present disclosure relate to a method of reducing or interrupting sympathetic stimulation to the cardiovascular system of a patient in need thereof, comprising: administering a composition comprising an effective amount of bupivacaine MVLs to one or more nerves of stellate ganglion of the patient, or an autonomic tissue area peripheral to the stellate ganglion, or a combination thereof. In some embodiments, the method further comprises identifying or selecting a patient has suffered from or is at risk of suffering from overactive or overstimulated sympathetic nerve system that are associated with one or more diseases or conditions of the cardiovascular system.

In some embodiments of the methods described herein, the patient has suffered from or is at risk of suffering from atrial tachyarrhythmia or refractory atrial tachyarrhythmia. In some embodiments, the patient has suffered from or is at risk of suffering from ventricular arrhythmia, ventricular tachycardia, ventricular fibrillation, refractory ventricular arrhythmia, refractory ventricular tachycardia, or refractory ventricular fibrillation. In some embodiments, the patient has suffered from or is at risk of suffering from a cardiac arrhythmia. For example, a cardiac arrhythmia selected from the group consisting of long QT syndrome, ischemic cardiomyopathy, dilated cardiomyopathy, valvular heart disease, acute myocardial infarction, and ongoing myocardial ischemia, and combinations thereof. In further embodiments, the patient has an implantable cardioverter-defibrillator (ICD). In some embodiments, the patient has had a heart surgery. In further embodiments, the cardiac arrythmia or electrical storm is associated with or occurs after the heart surgery.

In some embodiments of the methods described herein, the concentration of bupivacaine in the composition is from about 1 mg/mL to about 30 mg/mL. In further embodiments, the concentration of bupivacaine in the composition is about 13.3 mg/mL. In some embodiments, the effective amount of bupivacaine administered is from about 10 mg to about 200 mg, from about 20 mg to about 100 mg, or from about 25 mg to about 75 mg.

In some embodiments of the methods described herein, the total volume of the composition administered is from about 3 mL to about 20 mL. In some embodiments, the total volume of the composition administered is from about 5 mL to about 10 mL for unilateral stellate ganglion block. In further embodiments, the total volume of the composition administered is from about 10 mL to about 20 mL for bilateral stellate ganglion block. In some embodiments, bupivacaine is in a salt form. In further embodiments, the bupivacaine is in the form of bupivacaine phosphate.

In some embodiments of the methods described herein, the administering temporarily reduces or interrupts sympathetic stimulation to the cardiovascular system. In some embodiments, the temporary reduction or interruption of sympathetic stimulation to the cardiovascular system is for up to 3 days, 7 days, 10 days, 14 days, 21 days, 1, 2, 3, 4, 5 or 6 months.

In any embodiment of the methods described herein, the administrating of the composition of bupivacaine MVLs comprises:
  navigating a treatment apparatus to stellate ganglion of the patient, or an autonomic tissue area peripheral to the stellate ganglion, wherein the treatment apparatus comprises a needle and a compartment for the composition of bupivacaine MVLs;
  injecting bupivacaine encapsulated MVLs from the treatment apparatus to one or more nerves of the stellate ganglion, or the autonomic tissue area peripheral to the stellate ganglion, or a combination thereof; and
  removing the treatment apparatus from the patient.

In some embodiments, navigating the treatment apparatus to the stellate ganglion comprises inserting the needle of the treatment apparatus percutaneously to one or more nerves of the stellate ganglion area. In some embodiments, navigating the treatment apparatus to the stellate ganglion comprises inserting the needle of the treatment apparatus percutaneously to one or more nerves of the stellate ganglion, or one or more nerves of the autonomic tissue area peripheral to the stellate ganglion, or both. In further embodiments, navigating the treatment apparatus to the stellate ganglion comprises guiding the needle using an imaging guide. In further embodiments, the imaging guide comprises fluoroscopic or ultrasound imaging guide.

In some embodiments of the methods described herein, the injection comprises bolus injection, continuous infusion, or a combination thereof. In some embodiments, the administering is to the left stellate ganglion. In some embodiments, the administering is to both the left and the right stellate ganglion. In some embodiments, the one or more desired nerves of the stellate ganglion or the autonomic tissue area peripheral to the stellate ganglion comprise one or more desired nerves of the stellate ganglion. For example, the one or more desired nerves of the stellate ganglion comprise one or more desired nerves of a left stellate ganglion. In other embodiments, the one or more desired nerves of the stellate ganglion or the autonomic tissue area peripheral to the stellate ganglion comprise one or more desired nerves of the autonomic tissue area peripheral to the stellate ganglion. In other embodiments, the one or more desired nerves of the stellate ganglion or the autonomic tissue area peripheral to the stellate ganglion comprise one or more desired nerves of a paravertebral chain. In some such embodiments, the one or more desired nerves of the paravertebral chain comprises one or more desired nerves of one or more of a C7 region of the paravertebral chain, a C8 region of the paravertebral chain, a T1 region of the paravertebral chain, and a T2 region of the paravertebral chain. In further embodiments, the one or more desired nerves of the paravertebral chain comprise one or more desired nerves of a T1 region of the paravertebral chain and/or the T2 region of the paravertebral chain.

DETAILED DESCRIPTION

Embodiments of the present disclosure relate to methods of using bupivacaine multivesicular liposomes (MVLs) as stellate ganglion block (SGB) for treating or ameliorating various diseases and conditions, for example, cardiac arrythmia, cardiac arrythmia/dysrhythmia following heart surgery, or electrical storm, or combinations thereof.

The section headings used herein are for organizational purposes only and are not to be construed as limiting the subject matter described.

Definitions

The section headings used herein are for organizational purposes only and are not to be construed as limiting the subject matter described.

Unless defined otherwise, all technical and scientific terms used herein have the same meaning as is commonly understood by one of ordinary skill in the art. The use of "or" or "and" means "and/or" unless stated otherwise. The use of the term "including" as well as other forms, such as "include", "includes," and "included," is not limiting. The use of the term "having" as well as other forms, such as "have", "has," and "had," is not limiting. As used in this specification, whether in a transitional phrase or in the body of the claim, the terms "comprise(s)" and "comprising" are to be interpreted as having an open-ended meaning. That is, the above terms are to be interpreted synonymously with the phrases "having at least" or "including at least." For example, when used in the context of a process, the term "comprising" means that the process includes at least the recited steps, but may include additional steps. When used in the context of a compound, composition, formulation, or device, the term "comprising" means that the compound, composition, formulation, or device includes at least the recited features or components, but may also include additional features or components.

As used herein, the terms "bupivacaine encapsulated multivesicular liposomes", or "bupivacaine MVLs" refer to a multivesicular liposome composition encapsulating bupivacaine. In some embodiments, the composition is a pharmaceutical formulation, where the bupivacaine encapsulated multivesicular liposome particles are suspended in a liquid suspending medium to form a suspension. In some such embodiments, the BUP-MVL suspension may also include free or unencapsulated bupivacaine. In some cases, the free or unencapsulated bupivacaine may be less than about 8%, 7%, 6%, 5%, 4%, 3%, 2%, 1%, 0.5%, 0.2% or 0.1%, by weight of the total amount of the bupivacaine in the composition, or in a range defined by any of the two preceding values. In some embodiment, the free bupivacaine may be about 5% or less by weight of the total amount of the bupivacaine in the composition. In further embodiments, the free bupivacaine may be about 8% or less during the shelf life of the product (i.e., up to 2 years when stored at 2-8° C.).

As used herein, the term "encapsulated" means that bupivacaine is inside a liposomal particle, for example, the MVL particles. In some instances, bupivacaine may also be on an inner surface, or intercalated in a membrane, of the MVLs.

As used herein, the term "unencapsulated bupivacaine" or "free bupivacaine" refers to bupivacaine outside the liposomal particles, for example the MVL particles. For example, unencapsulated bupivacaine may reside in the suspending solution of these particles.

As used herein, "effective amount" or "pharmaceutically effective amount" is meant an amount of therapeutic agent, which has a therapeutic effect. The dosages of a pharmaceutically active ingredient which are useful in treatment are therapeutically effective amounts. Thus, as used herein, a therapeutically effective amount means an amount of therapeutic agent which produces the desired therapeutic effect as judged by clinical trial results and/or model animal studies.

"Treat," "treatment," or "treating," as used herein refers to administering a pharmaceutical composition/formulation for prophylactic and/or therapeutic purposes. The term "prophylactic treatment" refers to treating a patient who is not yet suffering from a disease, but who is susceptible to, or otherwise at risk of, a particular disease, whereby the treatment reduces the likelihood that the patient will develop a disease. The term "therapeutic treatment" refers to administering treatment to a patient already suffering from a disease.

Bupivacaine Multivesicular Liposomes

Some aspect of the present disclosure relates to a composition of bupivacaine encapsulated multivesicular liposomes (MVLs), comprising: bupivacaine residing inside a plurality of internal aqueous chambers of the MVLs separated by lipid membranes, wherein the lipid membranes comprise 1, 2-dierucoylphosphatidylcholine (DEPC), 1,2-dipalmitoyl-sn-glycero-3 phospho-rac-(1-glycerol) (DPPG), and at least one neutral lipid; and an aqueous medium in which the bupivacaine encapsulated MVLs are suspended.

In some embodiments, the composition of bupivacaine encapsulated MVLs may have a volume of 10 mL or 20 mL for a single dose administration. In some embodiments, the percent packed particle volume (% PPV) of the composition of bupivacaine encapsulated MVLs is about 32%, 33%, 34%, 35%, 36%, 37%, 38%, 39%, 40%, 41%, 42%, 43% or 44%. In some such embodiments, the concentration of the bupivacaine in the composition is from about 12.6 mg/mL to about 17 mg/mL. In one embodiment, the concentration of the bupivacaine in the composition is about 13.3 mg/mL. In further embodiments, the composition comprises less than 5%, 4%, 3%, 2% or 1% unencapsulated bupivacaine, wherein the amount of unencapsulated bupivacaine is calculate based on the total weight of the bupivacaine in the composition. In some embodiments, the $d_{50}$ of the multivesicular liposomes in the composition is about 24 μtm to about 31 μm. In one embodiment, the $d_{50}$ of the multivesicular liposomes in the composition is about 27 μm. The manufacturing of the bupivacaine MVLs are described in U.S. Publication Nos. 2002/0039596, 2006/0078606, and 2022/0304932, each of which is incorporated by reference in its entirety.

Pharmaceutical Compositions

In some embodiments, the composition comprising bupivacaine MVLs is a pharmaceutical formulation includes a pharmaceutically acceptable carrier. Effective injectable bupivacaine MVLs compositions is in a liquid suspension form. Such injectable suspension compositions require a liquid suspending medium, with or without adjuvants, as a vehicle. The suspending medium can be, for example, aqueous solutions of sodium chloride (i.e., saline solution), dextrose, sucrose, polyvinylpyrrolidone, polyethylene glycol, a pH modifying agent described herein, or combinations of the above. In some embodiments, the suspending medium of bupivacaine MVLs is a saline solution, optionally contain a tonicity agent such as dextrose and/or a pH modifying agent such as lysine.

Suitable physiologically acceptable storage solution components are used to keep the compound suspended in suspension compositions. The storage solution components can be chosen from thickeners such as carboxymethylcellulose, polyvinylpyrrolidone, gelatin and the alginates. Many surfactants are also useful as suspending agents. The suspending medium could also contain lecithin, alkylphenol polyethylene oxide adducts, naphthalenesulfonates, alkylbenzenesulfonates, or the polyoxyethylene sorbitan esters. In some embodiments, the bupivacaine MVL composition is free or substantially free of any additive of preservatives.

In any embodiments of the composition of bupivacaine encapsulated MVLs described herein, the composition may be a pharmaceutical composition suitable for human administration. In further embodiments, the composition may be an aqueous suspension of bupivacaine encapsulated MVL particles. In some embodiments, the administered bupivacaine is in a salt form. In further embodiments, the administered bupivacaine is in the form of bupivacaine phosphate.

Methods of Treatment

Some embodiments of the present disclosure relate to a method of treating a patient suffering from electrical storm, comprising administering a composition containing bupivacaine multivesicular liposomes (MVLs) as described herein. Some embodiments of the present disclosure relate to a method of treating or ameliorating a cardiopulmonary disease in a patient in need thereof, comprising administering a composition containing bupivacaine MVLs. The present embodiments also provide a method of reducing or interrupting sympathetic stimulation to the cardiovascular system of a patient in need thereof, comprising administering a composition containing bupivacaine MVLs. In some embodiments, the methods disclosed herein include administering a composition containing bupivacaine MVLs to one or more nerves of stellate ganglion of the patient, or one or more nerves of an autonomic tissue area peripheral to the stellate ganglion, or a combination thereof. In some embodiments, the methods include identifying or selecting a patient has suffered from or is at risk of suffering from one or more episodes of cardiac arrythmia, or electrical storm. In some embodiments, the methods include identifying or selecting a patient has suffered from or is at risk of suffering from a cardiopulmonary disease. In some embodiments, the methods include identifying or selecting a patient has suffered from or is at risk of suffering from the overactive or overstimulated sympathetic nerve system that are associated with one or more diseases or conditions of the cardiovascular system.

In some embodiments of the methods disclosed herein, the administration of the bupivacaine MVLs to one or more nerves of stellate ganglion of the patient, or autonomic tissue area peripheral to the stellate ganglion, temporarily reduces or interrupts sympathetic stimulation to the cardiovascular system for a sustained period of time. In some embodiments, the temporary reduction or interruption of sympathetic stimulation to the cardiovascular system is for up to 3 days, 7 days, 10 days, 14 days, 21 days, 1, 2, 3, 4, 5 or 6 months.

Patients

In some embodiments, the method further includes identifying or selecting a patient to benefit from the treatments with bupivacaine MVLs as described herein. In some embodiments, the patient suffers from electrical storm. In further embodiments, the patient has suffered from or is at risk of suffering from cardiac arrythmia (e.g., electrical storm). In some embodiments, the patient is in need of treating or ameliorating a cardiopulmonary disease. In further embodiments, the patient has suffered from or is at risk of suffering from a cardiopulmonary disease. In some embodiments, the patient is in need of reducing or interrupting sympathetic stimulation to the cardiovascular system. In further embodiments, the patient has suffered from or is at risk of suffering from overactive or overstimulated sympathetic nerve system that are associated with one or more diseases or conditions of a cardiovascular system. In some embodiments, the diseases or conditions of a cardiovascular system comprise ventricular arrhythmias following coronary artery occlusion, catecholaminergic polymorphic ventricular tachycardia, monomorphic ventricular tachycardia, idiopathic ventricular tachycardia, or recurrent ventricular fibrillation, or combinations thereof. In some such embodiments, the patient has suffered from or is at risk of suffering from atrial tachyarrhythmia. In some embodiments, the patient has suffered from or is at risk of suffering from refractory atrial tachyarrhythmia. In other embodiments, the patient has suffered from or is at risk of suffering from ventricular arrhythmia, ventricular tachycardia, ventricular fibrillation, refractory ventricular arrhythmia, refractory ventricular tachycardia, and refractory ventricular fibrillation, and combinations thereof. In some other embodiments, the patient has suffered from or is at risk of suffering from a cardiac arrhythmia, for example, a cardiac arrhythmia selected from the group consisting of long QT syndrome, ischemic cardiomyopathy, dilated cardiomyopathy, valvular heart disease, acute myocardial infarction, and ongoing myocardial ischemia, and combinations thereof. In certain embodiments, disabling the nerves of the stellate ganglion and/or autonomic tissue peripheral to the stellate ganglion using the SGB therapy as described herein can be used to treat a patient who has suffered from or is at risk of suffering from cardiac dysrhythmia following heart surgery.

In some embodiments, the patient has an implantable cardioverter-defibrillator (ICD). For example, cardiac electrical storm can occur in patients having an ICD. The methods herein can be used to treat the cardiac electrical storm and prevent repeated shocks from the ICD.

In some embodiments, the patient has previously been treated with catheter-based ablation. In some embodiments, the patient has had a heart surgery, for example, an open heart surgery. In further embodiments, the patient has suffered from cardiac arrythmia from the heart surgery.

In any embodiments of the patients to be treated by the method described in, the patient may be administered one or more anti-arrythmia medications before the SGB. The anti-arrythmia medication may include but not limited to beta-blockers, amiodarone, lidocaine, sotalol, procainamide, mexiletine, quinidine, ajmaline, bretylium, phenytoin, digitalis, isoproterenol, and verapamil. In such embodiments, the method further comprises administering the patient with one or more anti-arrythmia medications as described herein.

In some embodiments, using the methods described herein can provide for relief from the structural conditions for an extended period of time (for example, up to 1, 2, 3, 4, 5, or 6 months) to allow time for an additional treatment, such as a heart transplant or implantation of a mechanical circulatory support device or left ventricular assist device.

Dosage

In some embodiments of the methods disclosed herein, the concentration of bupivacaine in the composition is from about 1 mg/mL to about 30 mg/mL. In some embodiments, the concentration of bupivacaine in the composition is from about 1 mg/mL to about 30 mg/mL, from about 5 mg/mL to about 20 mg/mL, or from about 10 mg/mL to about 15 mg/mL. In some embodiments, the concentration of bupivacaine in the composition is from about 12 mg/mL to about 14 mg/mL. In some embodiments, the concentration of bupivacaine in the composition is about 13.3 mg/mL.

In some embodiments of the methods disclosed herein, the effective amount of bupivacaine administered is about 5 mg, 10 mg, 20 mg, 30 mg, 40 mg, 50 mg, 60 mg, 70 mg, 80 mg, 90 mg, 100 mg, 110 mg, 120 mg, 130 mg, 140 mg, 150 mg, 160 mg, 170 mg, 180 mg, 190 mg, 200 mg, 220 mg, 240 mg, 260 mg, 280 mg, or 300 mg, or a range defined by any two of the preceding values. In further embodiments, the effective amount of from about 10 mg to about 200 mg, from about 20 mg to about 150 mg, from 25 mg to about 100 mg, or from 30 mg to about 75 mg. In one embodiment, the amount of bupivacaine administered is about 66.5 mg. In another embodiment, the amount of bupivacaine administered is about 133 mg.

In some embodiments of the methods disclosed herein, the total volume of the bupivacaine MVL composition administered is about 1 mL, 2 mL, 3 mL, 4 mL, 5 mL, 6 mL, 7 mL, 8 mL, 9 mL, 10 mL, 11 mL, 12 mL, 13 mL, 14 mL, 15 mL, 16 mL, 17 mL, 18 mL, 19 mL or 20 mL, or a range defined by any two of the preceding values. In further embodiments, the total volume of the bupivacaine MVL composition administered is from about 1 mL to about 20 mL, from about 2 mL to about 15 mL, from about 3 mL to about 10 mL or from about 4 mL to about 8 mL, or about 5 mL. The total volume refers to the volume administered in a single dose in one area, for example, either to the left stellate ganglion or the right stellate ganglion. For bilateral SGB, if the volume administered to each side is about 5 mL, then the patient receives a total volume of 10 mL. In further embodiments, the total volume of the composition administered is from about 5 mL to about 15 mL for unilateral stellate ganglion block. In another embodiment, the total volume of the bupivacaine MVLs composition administered is about 10 mL for unilateral stellate ganglion block. In further embodiments, the total volume of the composition administered is from about 10 mL to about 20 mL for bilateral stellate ganglion block. In one embodiment, the total volume of the composition administered is about 20 mL for bilateral stellate ganglion block.

In any embodiments of the methods described herein, the composition of bupivacaine MVLs may extend the effect or duration of the SGB by at least 10%, 15%, 20%, 25%, 30%, 35%, 40%, 45%, 50%, 60%, 70%, 80%, 90%, or 100%, when compared to the administration of the same dose amount of bupivacaine in an immediate release formulation. In any embodiments of the methods described herein, the administration of bupivacaine MVLs as SGB may improve the reduction of the cardiac arrythmia episodes (such as VA or VT episode(s), or electric storm) by at least 10%, 15%, 20%, 25%, 30%, 35%, 40%, 45%, 50%, 60%, 70%, 80%, 90%, or 100%, when compared to the administration of the same dose amount of bupivacaine in an immediate release composition. The reduction of the cardiac arrythmia episode(s) may be measured by the incidence of the episode(s) after the SGB therapy described herein, or the during of the episode(s) after the SGB therapy described herein. In some such embodiments the, the measurement is taken 3 days, 4 days, 5 days, 6 days, 1 week, 2 weeks, 3 weeks, 4 weeks, 2 months, 3 months, 4 months, 5 months or 6 months after the SGB therapy described herein.

Methods of Administration

Some embodiments of the present application are related to methods of administering a composition comprising an effective amount of bupivacaine MVLs, as described herein, to one or more nerves of stellate ganglion of a patient, or an autonomic tissue area peripheral to the stellate ganglion, or a combination thereof. In some embodiments, a treatment apparatus comprises a needle and a compartment for the bupivacaine MVLs.

In some embodiments of the methods described herein, the administration includes navigating a treatment apparatus to stellate ganglion of the patient, or an autonomic tissue area peripheral to the stellate ganglion; injecting bupivacaine encapsulated MVLs to one or more nerves of the stellate ganglion, or to one or more nerves of the autonomic tissue area peripheral to the stellate ganglion, or both; and removing the treatment apparatus from the patient. In some embodiments, the one or more desired nerves of the stellate ganglion or the autonomic tissue area peripheral to the stellate ganglion comprise one or more desired nerves of the stellate ganglion. For example, the one or more desired nerves of the stellate ganglion comprise one or more desired nerves of a left stellate ganglion. In other embodiments, the one or more desired nerves of the stellate ganglion or the autonomic tissue area peripheral to the stellate ganglion comprise one or more desired nerves of the autonomic tissue area peripheral to the stellate ganglion. In other embodiments, the one or more desired nerves of the stellate ganglion or the autonomic tissue area peripheral to the stellate ganglion comprise one or more desired nerves of a paravertebral chain. In some such embodiments, the one or more desired nerves of the paravertebral chain comprises one or more desired nerves of one or more of a C7 region of the paravertebral chain, a C8 region of the paravertebral chain, a T1 region of the paravertebral chain, and a T2 region of the paravertebral chain. In further embodiments, the one or more desired nerves of the paravertebral chain comprise one or more desired nerves of a T1 region of the paravertebral chain and/or the T2 region of the paravertebral chain.

In some embodiments of the method described herein, navigating the treatment apparatus to the stellate ganglion includes inserting the needle of the treatment apparatus percutaneously to one or more nerves of the stellate ganglion area, or to one or more nerves of the autonomic tissue area peripheral to the stellate ganglion, or both. For example, through an anterior wall of the trachea to tissue comprising a deep cardiac plexus. In some embodiments, navigating the treatment apparatus to the stellate ganglion includes guiding the needle using an imaging guide. In further embodiments, the imaging guide comprises fluoroscopic or ultrasound imaging guide. The patient may be under general anesthesia or be intubated. In some embodiments, the administration is to the left stellate ganglion. In some embodiments, the administration is to the right stellate ganglion. In some embodiments, the administration is to both the left and the right stellate ganglion.

In some embodiments, the bupivacaine MVLs may be administered by bolus injection, continuous infusion, or a combination thereof. Administration of the instant bupivacaine MVL composition may also be accomplished using standard methods and devices, e.g., injector systems, needle and syringe, a subcutaneous injection port delivery system, and the like. The administration of the bupivacaine MVLs composition may be used in conjunction with Pacira's handheld cryoanalgesia device iovera®.

EXAMPLES

The following examples, including experiments and results achieved, are provided for illustrative purposes only and are not to be construed as limiting the present application.

Example 1: Stellate Ganglion Blockade Procedure

In this example, patients suffering from cardiac electrical storm (e.g., occurrence of three or more episodes of sustained ventricular arrhythmia within 24 hours) are selected. The procedure is carried out at the patient's bedside. After anesthetizing the overlying skin, bupivacaine multivesicular liposomes (e.g., Exparel®) is injected anterior to the patient's longus colli muscle. Ultrasound guidance is used to introduce a 2.5 cm 25-gauge needle at one or more of patient's C6 or C7 region of the paravertebral chain for continuous infusion of bupivacaine encapsulated MVLs of the present disclosure. On the ultrasound image, Chassaignac's tubercle can be identified as a ridge at the level of C6, which flattens out at the level of C7 if the ultrasound probe is moved caudally. The mean infusion rate is about 5 mL per hour. The needle is directed toward the longus colli muscle overlying Chassaignac's tubercle, following an oblique path medial to the common carotid artery and jugular vein. In this example, the efficacy of stellate ganglion block is determined by quantifying electrical storm burden as the episodes of ventricular arrhythmia per day and number of external or implantable cardioverter-defibrillator shocks per day.

While the present application has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A method of treating a patient suffering from cardiac electrical storm, comprising:
    identifying or selecting a patient who has suffered from or is at risk of suffering from cardiac electrical storm or one or more episodes of cardiac arrhythmia; and
    administering a composition of bupivacaine multivesicular liposomes (MVLs) to one or more nerves of stellate ganglion of the patient, or an autonomic tissue area peripheral to the stellate ganglion, wherein the composition comprises about 20 mg to about 100 mg bupivacaine;
    wherein the administering of bupivacaine MVLs provides relief of cardiac electrical storm for 2 weeks and up to 6 months, and temporarily reduces or interrupts sympathetic stimulation to the cardiovascular system for 2 weeks and up to 6 months.

2. The method of claim 1, wherein the patient has suffered from or is at risk of suffering from ventricular arrhythmia, ventricular tachycardia, ventricular fibrillation, refractory ventricular arrhythmia, refractory ventricular tachycardia, or refractory ventricular fibrillation.

3. The method of claim 1, wherein the patient has an implantable cardioverter-defibrillator (ICD) or had a heart surgery.

4. The method of claim 1, wherein the concentration of bupivacaine in the composition is about 13.3 mg/mL.

5. The method of claim 1, wherein the composition comprises from about 25 mg to about 75 mg bupivacaine.

6. The method of claim 1, wherein the total volume of the composition administered is from about 3 mL to about 20 mL.

7. The method of claim 6, wherein the total volume of the composition administered is from about 5 mL to about 10 mL for unilateral stellate ganglion block.

8. The method of claim 6, wherein the total volume of the composition administered is from about 10 mL to about 20 mL for bilateral stellate ganglion block.

9. The method of claim 1, wherein the bupivacaine is in the form of bupivacaine phosphate.

10. The method of claim 1, wherein the administrating of the composition of bupivacaine MVLs comprises:
    navigating a treatment apparatus to stellate ganglion of the patient, or an autonomic tissue area peripheral to the stellate ganglion, wherein the treatment apparatus comprises a needle and a compartment for the composition of bupivacaine MVLs;
    injecting the bupivacaine MVLs from the treatment apparatus to the one or more nerves of the stellate ganglion, or the autonomic tissue area peripheral to the stellate ganglion; and
    removing the treatment apparatus from the patient.

11. The method of claim 10, wherein navigating the treatment apparatus to the stellate ganglion comprises inserting the needle of the treatment apparatus percutaneously to the one or more nerves of the stellate ganglion, or the autonomic tissue area peripheral to the stellate ganglion.

12. The method of claim 10, wherein navigating the treatment apparatus to the stellate ganglion comprises guiding the needle using an imaging guide.

13. The method of claim 12, wherein the imaging guide comprises a fluoroscopic or an ultrasound imaging guide.

14. The method of claim 10, wherein the injection comprises bolus injection, continuous infusion, or a combination thereof.

15. The method of claim 10, wherein the administering is to the left stellate ganglion or to both the left and the right stellate ganglion.

16. The method of claim 10, wherein the one or more nerves of the stellate ganglion or the autonomic tissue area peripheral to the stellate ganglion comprise one or more nerves of both the left and the right stellate ganglion, or one or more nerves of the left stellate ganglion.

17. The method of claim 10, wherein the one or more nerves of the stellate ganglion or the autonomic tissue area peripheral to the stellate ganglion comprise one or more nerves of a paravertebral chain.

18. The method of claim 17, wherein the one or more nerves of the paravertebral chain comprises one or more nerves of a C7 region of the paravertebral chain, a C8 region of the paravertebral chain, a T1 region of the paravertebral chain, or combinations thereof.

* * * * *